United States Patent [19]

Gessell

[11] 4,244,838

[45] Jan. 13, 1981

[54] HIGH EFFICIENCY CATALYST FOR POLYMERIZING OLEFINS

[75] Inventor: Donald E. Gessell, Baton Rouge, La.

[73] Assignee: The Dow Chemical Company, Midland, Mich.

[21] Appl. No.: 51,586

[22] Filed: Jun. 25, 1979

[51] Int. Cl.$^3$ .............................................. C08F 4/64
[52] U.S. Cl. ........................... 252/429 B; 252/429 C; 252/431 R; 526/138; 526/142; 526/125; 526/132; 526/134
[58] Field of Search ............. 252/429 B, 431 R, 429 C

[56] References Cited

U.S. PATENT DOCUMENTS

| | | |
|---|---|---|
| 2,956,993 | 10/1960 | Nowlin et al. |
| 3,129,256 | 4/1964 | Hay et al. ..................... 252/429 B X |
| 3,334,079 | 8/1967 | Raich . |
| 3,478,008 | 11/1969 | Ledbetter .............................. 252/429 |
| 3,549,717 | 12/1970 | Itakura et al. ................ 252/429 B X |
| 3,644,318 | 2/1972 | Diedrich et al. ............. 252/429 C X |
| 3,821,186 | 6/1974 | Grant ............................. 252/429 C X |
| 3,878,124 | 4/1975 | Durand et al. .................... 252/429 B |
| 3,901,863 | 8/1975 | Berger et al. . |
| 3,951,935 | 4/1976 | Engelmann ................... 252/431 R X |
| 3,960,765 | 6/1976 | Shiga et al. ......................... 252/429 B |
| 4,004,071 | 1/1977 | Aishima et al. .............. 252/429 C X |
| 4,027,089 | 5/1977 | Aishima et al. .............. 252/429 B X |
| 4,039,472 | 8/1977 | Hoff .................................. 252/429 C |
| 4,063,009 | 12/1977 | Ziegler et al. ......................... 526/159 |
| 4,067,822 | 1/1978 | Gessell et al. ..................... 252/429 B |
| 4,104,198 | 8/1978 | May .................................. 252/429 B |
| 4,115,319 | 9/1978 | Scata et al. ........................ 252/429 B |
| 4,120,820 | 10/1978 | Birkeibach ........................ 252/429 B |
| 4,120,883 | 10/1978 | Ikegami et al. .............. 252/431 R X |
| 4,136,058 | 1/1979 | Harris et al. ...................... 252/429 B |

FOREIGN PATENT DOCUMENTS

| | | |
|---|---|---|
| 845983 | 3/1977 | Belgium . |
| 942873 | 2/1974 | Canada . |
| 2758312 | 7/1978 | Fed. Rep. of Germany . |
| 51-102086 | 9/1976 | Japan . |
| 51-111281 | 10/1976 | Japan . |
| 51-148785 | 12/1976 | Japan . |
| 52-98076 | 8/1977 | Japan . |
| 762246 | 4/1976 | South Africa . |
| 1235062 | 6/1971 | United Kingdom . |
| 1275641 | 5/1972 | United Kingdom . |
| 1306001 | 2/1973 | United Kingdom . |
| 1311013 | 3/1973 | United Kingdom . |
| 1315770 | 5/1973 | United Kingdom . |
| 1321766 | 6/1973 | United Kingdom . |
| 1357474 | 6/1974 | United Kingdom . |
| 1358437 | 7/1974 | United Kingdom . |
| 1444736 | 8/1976 | United Kingdom . |
| 1492379 | 11/1977 | United Kingdom . |
| 1500873 | 2/1978 | United Kingdom . |
| 1502567 | 3/1978 | United Kingdom . |
| 1504930 | 3/1978 | United Kingdom . |

OTHER PUBLICATIONS

Bohm, "Ethylene Polymerization Process with A Highly Active Ziegler-Natta Catalyst", *Polymer*, vol. 19, (5/78), pp. 553–561.

*Primary Examiner*—Patrick Garvin
*Attorney, Agent, or Firm*—J. G. Carter

[57] ABSTRACT

Solid supported catalysts which can be employed for the polymerization of α-olefins are prepared by (A) reacting in the presence of a diluent such as n-hexane a mixture of (1) the reaction product of (a) an organo magnesium compound such as dibutyl magnesium and (b) at least one of water, carbon dioxide or an organic, oxygen-containing compound such as n-propyl alcohol; and (2) a transition metal halide such as titanium tetrachloride and (B) recovering the solid precipitate such as by decanting and (C) washing the solid with a solvent such as n-hexane. The resultant solid supported catalyst contains sufficient transition metal which when activated with a suitable activating agent serves as a polymerization catalyst for α-olefins. The polymers prepared employing these catalysts have a relatively narrow molecular weight distribution and low residual amounts of transition metal and halides.

30 Claims, No Drawings

HIGH EFFICIENCY CATALYST FOR POLYMERIZING OLEFINS

BACKGROUND OF THE INVENTION

This invention relates to a new catalyst composition useful for initiating and promoting polymerization of α-olefins and to a polymerization process employing such a catalyst compostion.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleeve's Periodic Table of Elements with an organometallic compound. Generally the halides, oxyhalides and alkoxides or esters of titanium, vanadium and zirconium are the most widely used transition metal compounds. Common examples of the organometallic compounds include the hydride, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agents such as an aqueous basic solution. Such catalyst deactivation and/or removal procedures are expensive both in time and material consumed as well as the equipment required to carry out such treatment.

Moreover, most slurry polymerization processes employing the aforementioned known catalyst systems are accompanied by reactor fouling problems. As a result of such reactor fouling, it is necessary to frequently stop the process to clean the polymerization reactor.

In view of the foregoing problems encountered in the use of conventional Ziegler catalysts, it would be highly desirable to provide a polymerization catalyst which is sufficiently active to eliminate the need for catalyst residue removal and which minimizes reactor fouling problems. In slurry polymerization processes, it would be especially desirable to provide a high efficiency catalyst that will yield a polyolefin powder having an unsettled bulk density of 20-35 pounds per cubic foot.

SUMMARY OF THE INVENTION

The present invention in one aspect is the hydrocarbon insoluble solid catalytic reaction product of (1) the reaction product of (a) a hydrocarbyl magnesium compound or a hydrocarbyl or hydrocarbyloxy aluminum, zinc or boron mixture or complex thereof with (b) at least one of water, carbon dioxide or an organic, oxygen-containing compound free of halogen and nitrogen atoms and (2) a halide-containing transition metal compound or mixture thereof.

The components are employed in quantities such that a sufficient amount of component (1-b) is employed so as to react with the hydrocarbyl group present in component (1-a) which results in a product which will not substantially reduce $TiCl_4$ at a temperature of about 25° C. A sufficient quantity of halide-containing transition metal compound is employed so as to convert substantially all of the organic groups attached to a magnesium atom in component (1) to a halide group. The halogen:Mg ratio is usually from about 500:1 to about 2:1, preferably from about 100:1 to about 3:1 and most preferably from about 50:1 to about 4:1. The Mg:Ti ratio is usually from about 0.01:1 to about 1.5:1, preferably from about 0.1:1 to about 1:1. The water, carbon dioxide or organic, oxygen-containing compound is preferably employed in sufficient quantities to lower the hydrocarbyl content of component (1-a) to a value as close to zero as is partically possible within a reasonable period of time.

A suitable test for determining whether or not the quantity of component (1-b) is sufficient to lower the amount of hydrocarbyl groups present in component (1-a) to produce a product which will not substantially reduce $TiCl_4$ at 25° C. is to take an aliquot of the reaction product of components (1-a) and (1-b) and remove or add organic diluent thereby adjusting the magnesium component to about 0.2 molar. Then add 5 milliliters of a $TiCl_4$ solution which is at least 1 molar in a hydrocarbon to 50 milliliters of the about 0.2 molar sample. If the resultant slurry turns brown or blackish brown, considerable reduction of $TiCl_4$ has occurred, which is undesirable. A slight tan color is indicative of only slight reduction (i.e. not substantial) and is acceptable. Most desirable is a white or yellowish white color which indicates essentially no reduction of $TiCl_4$.

The present invention in another aspect is the solid catalyst obtained from contacting the above solid supported catalyst with an activating agent.

The present invention also concerns a process for preparing a hydrocarbon insoluble solid catalyst which process comprises (A) reacting in the presence of an inert diluent
  (1) the reaction product of
    (a) a magnesium component or mixture of such components represented by the formula $MgR_2 \cdot xMeR'_{x'}$, wherein each R is independently a hydrocarbyl group having from 1 to about 20, preferably from 1 to about 10 carbon atoms, each R' is independently a hydrocarbyl or a hydrocarbyloxy group having from 1 to about 20, preferably from 1 to about 10 carbon atoms, Me is aluminum, zinc or boron, x has a value of from zero to about 10 and x' has a value equal to the valence of Me; with
    (b) a sufficient amount of at least one of water, carbon dioxide or an organic, oxygen-containing compound free of halogen and nitrogen atoms so as to react with the hydrocarbyl groups present in component (1-a) to produce a product which will not substantially reduce TiCl$_4$ at a temperature of about 25° C.; with (2) a halide-containing transition metal compound or mixture thereof represented by the formula TmY$_n$X$_{z-n}$ wherein Tm is a metal selected from groups IV-B, V-B and VI-B of the Periodic Table of Elements, Y is oxygen or OR'', each X is a halogen, each R'' is independently a hydrocarbyl group having from 1 to about 20 carbon atoms, z has a value equal to the valence of said transition metal, n has a value of from zero to 6 with the value of z-n being from at least 1 up to a value equal to the valence of the transition metal; said halide-containing transition metal being present in a quantity so as to convert substantially all of the substituent groups attached to a magnesium atom in component (1) to a halide group;

(B) recovering the resultant hydrocarbon insoluble reaction product therefrom;

(C) reacting said hydrocarbon insoluble reaction product with an activating agent represented by the formulas AlR$^3{}_{3-m}$X$_m$, ZnR$^3{}_2$, ZnR$^3$X, MgR$^3$X or MgR$^3{}_2$ including mixtures thereof wherein each R$^3$ is independently a hydrocarbyl group, X is a halogen, preferably chlorine or bromine, or a hydrocarbyloxy group, m has a value from zero to 2, preferably zero or 1 and most preferably zero in a quantity so as to provide an Al, Zn and/or Mg:Tm ratio of from about 1:1 to about 5000:1, preferably from 5:1 to aout 1000:1 and most preferably from 10:1 to about 400:1.

Another aspect of the invention is a process for polymerizing α-olefins or mixtures thereof which comprises conducting the polymerization in the presence of the aforementioned catalysts.

DETAILED DESCRIPTION OF THE PREFERRED EMBODIMENTS

The organo magnesium compounds which are suitably employed in the present invention include those represented by the formula R$_2$Mg.xMeR'$_x$·, wherein each R is independently a hydrocarbyl group, each R' is independently a hydrocarbyl or hydrocarbyloxy group, Me is aluminum, zinc or born and x' has a value equal to the valence of the metal Me.

The term hydrocarbyl as employed herein refers to a monovalent and in some instances a divalent hydrocarbon radical such as alkyl cycloalkyl, aryl, aralkyl, alkenyl and similar hydrocarbon radicals having from 1 to about 20 carbon atoms with alkyl having from 1 to 10 carbon atoms being preferred.

The term hydrocarbyloxy as employed herein refers to monovalent oxyhydrocarbon radicals such as alkoxy, cycloalkoxy, aryloxy, aralkoxy, alkenoxy and similar oxyhydrocarbon atoms having from 1 to about 20 carbon atoms with alkoxy groups having from 1 to 10 carbon atoms being the preferred hydrocarbyloxy radicals.

The quantity of MeR'$_x$· i.e. the value of x, is preferably from the minimum amount which is sufficient to render the magnesium compound soluble in the inert solvent or diluent which is usually a hydrocarbon or mixture of hydrocarbons up to a value of about 10. The value of x therefore is from zero to about 10, usually from zero to about 2, preferably from about 0.2 to about 1. Most preferably, the value of x is such that the reaction product (1) is hydrocarbon soluble. When carbon dioxide is employed alone as component (1-a), x must have a value greater than zero, preferably from about 0.1 to about 5.0 and most preferably from about 0.5 to about 2.0.

Particularly suitable organomagnesium compounds include, for example, di-(n-butyl) magnesium, n-butyl-sec-butylmagnesium, diisopropylmagnesium, di-n-hexylmagnesium, isopropyl-n-butyl magnesium, ethyl-n-hexyl magnesium, ethyl-n-butylmagnesium, di-n-butyl-magnesium.½ triisobutylaluminum, di-(n-butyl)magnesium.1/6 triethylaluminum, dibutylmagnesium.2 triisobutylaluminum, butyl-octylmagnesium, dihexylmagnesium.½ triisobutylaluminum, butylethylmagnesium.½ triisobutylaluminum, butyloctylmagnesium.½ triisobutylaluminum, mixtures thereof and the like.

Suitable organic, oxygen-containing compounds free of halogen and nitrogen atoms which can be employed herein as component (1-b) include, for example, hydroxyl-containing compounds such as alcohols, glycols, polyoxyalkyleneglycols, aldehydes, ketones, carboylic acids, acetals, ketals, esters of carboxylic acids, orthoesters, anhydrides of carboxylic acids, carbonates, mixtures thereof and the like. It is preferred that these compounds be liquids at the temperature at which the catalyst is prepared and also be miscible with the inert diluent in which the catalyst is prepared.

Suitable hydroxyl-containing compounds include those represented by formulas

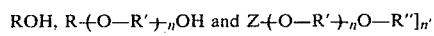

ROH, R+O—R'+$_n$OH and Z+O—R'+$_n$O—R'']$_{n'}$ wherein each R is hydrogen or a hydrocarbyl group having from 1 to about 20 carbon atoms, each R' is independently a divalent hydrocarbyl group having from 1 to about 20 carbon atoms, each R' is independently hydrogen or a hydrocarbyl group having from 1 to about 20 carbon atoms, at least one of which is hydrogen, Z is a multivalent organic radical containing from 2 to about 20 carbon atoms, n has a value from zero to about 40 and n' has a value of from 3 to about 8. Practically, the values of n and n' are such that the hydroxyl-containing compounds are liquids at the catalyst preparation temperature.

Particularly suitable hydroxyl-containing compounds include alcohols such as, for example methyl alcohol, ethyl alcohol, n-propyl alcohol, isopropyl alcohol, n-butyl alcohol, sec-butyl alcohol, tert-butyl alcohol phenol 2,6-diisopropylphenol, glycols such as, for example, ethylene glycol, 1,2-propylene glycol, 1,2-butylene glycol, 1,3-propylene glycol, 1,4-butanediol, 1,6-hexane diol, other hydroxyl containing compounds such as, for example, glycerine, trimethylal propane and pentaerythritol, as well as adducts of ethylene oxide, 1,2-propylene oxide, 1,2-butylene oxide, 2,3-butylene oxide, styrene oxide or mixtures of such oxides with the previously mentioned hydroxyl-containing compounds as well as the alkyl and aryl capped hydroxyl-containing compounds so long as there remains at least 1 hydroxyl group per molecule.

Suitable aldehydes which can be employed herein include those aldehydes represented by the formula

$$\underset{\text{R—C—H}}{\overset{\text{O}}{\|}}$$

wherein R is hydrogen or a hydrocarbyl group having from 1 to about 20 carbon atoms, preferably an aliphatic hydrocarbyl group having from 1 to about 10 carbon atoms. Particularly suitable aldehydes include, for example, formaldehyde, acetaldehyde, propionaldehyde, butryaldehyde, benzaldehyde, mixtures thereof and the like.

Suitable ketones which can be employed herein include, for example, those represented by the formula

wherein each R is independently a hydrocarbyl group having from 1 to about 20 carbon atoms, preferably from 1 to about 10 carbon atoms. Particularly suitable ketones include, for example, acetone, methyl ethyl ketone, 2,6-dimethyl-4-heptanone, mixtures thereof and the like.

The hydroxyl-containing materials, particularly the alcohols, and the aldehydes and ketones, can contain up to about 50% water by weight and preferably up to about 1 percent water by weight.

Suitable carboxylic acids which can be employed herein include those represented by the formulas

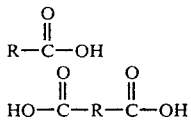

wherein each R is a hydrocarbyl group having from 1 to about 20 carbon atoms, particularly from about 1 to about 20 carbon atoms. Particularly suitable carboxylic acids include, for example, formic acid, acetic acid, propionic acid, oxalic acid, benzoic acid, 2-ethylhexanoic acid, acrylic acid, mixtures thereof and the like.

Suitable acetals which can be employed herein include, for example, those represented by the formula

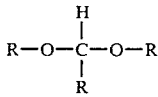

wherein each R is independently a hydrocarbyl group having from 1 to about 20 carbon atoms, preferably from 1 to about 10 carbon atoms. Particularly suitable acetals which can be employed includes, for example, acetal, 1,1-diethoxypropane, mixtures thereof and the like.

Suitable ketals which can be employed herein include, for example, those represented by the formula

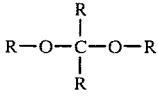

wherein each R is independently a hydrocarbyl group having from 1 to about 20 carbon atoms, preferably from 1 to about 10 carbon atoms. Particularly suitable ketals include, for example, 2,2-dimethoxypropane, 2,2-dimethoxyhexane, 2,2-diethoxypropane, mixtures thereof and the like.

Suitable esters of carboxylic acids which can be employed herein include, for example, those represented by the formulas

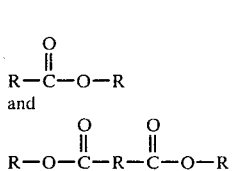

wherein each R is independently a hydrocarbyl group having from 1 to about 20 carbon atoms, preferably from 1 to about 0 carbon atoms. Particularly suitable esters include, for example, ethyl acetate, ethyl formate, ethyl benzoate, methyl acetate, methyl formate, mixtures thereof and the like.

Suitable orthoesters which can be employed herein include, for example, those represented by the formula

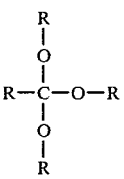

wherein each R is independently a hydrocarbyl group having from 1 to about 20 carbon atoms, preferably from 1 to about 10 carbon atoms. Particularly suitable orthoesters include, for example, triethylorthoformate, triethylorthoacetate mixtures thereof and the like.

Suitable carbonates which can be employed herein include, for example, those represented by the formulas

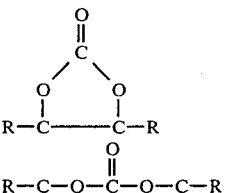

wherein each R is independently a hydrocarbyl group having from 1 to about 20 carbon atoms, preferably from 1 to about 10 carbon atoms. Particularly suitable carbonates include, for example, diethylcarbonate, ethylene carbonate, dipropylcarbonate, propylene carbonate, styrene carbonate, mixtures thereof and the like.

Suitable carboxylic acid anhydrides include, for example, those represented by the formulas

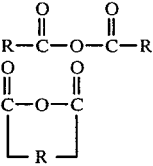

wherein each R is independently a hydrocarbyl group having from 1 to about 20 carbon atoms, preferably from 1 to about 10 carbon atoms. Particularly suitable anhydrides include, for example, acetic anhydride, propionic anhydride mixtures thereof and the like.

Suitable halide-containing transition metal compounds which can be employed include those compounds represented by the formula $TmY_nX_{z-n}$ wherein Tm is a transition metal selected from groups IV-B, V-B and VI-B of the Periodic Table of the Elements, Y is oxygen or OR'', each R'' is independently a hydrocarbyl group as previously defined, X is a halogen, preferably chlorine or bromine, z has a value corresponding to the valence of the transition metal, Tm, n has a value of from zero to 6 with the value of z-n being from at least 1 up to a value equal to the valence state of the transition metal, Tm.

Particularly suitable are the hydrocarbon soluble transition metal compounds such as, for example, titanium tetrachloride, titanium tetrabromide, dibutoxy titanium dichloride, monoethoxytitanium trichloride, vanadium oxytrichloride, vanadium tetrachloride, chromium trichloride, mixtures thereof and the like.

Suitable organic inert diluents in which the catalysts can be prepared and in which the α-olefin polymerization can be conducted include, for example, liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, especially those having boiling points in the range from about $-50°0$ to about $200°$ C. Also included as suitable inert diluents are benzene, toluene, ethylbenzene, cumene, decalin and the like. Most suitable are the hydrocarbons having from 4 to about 10 carbon atoms.

The catalysts of the present invention are advantageously prepared under an inert atmosphere such as nigrogen, argon or other inert gas at temperatures in the range of from about 50° C. to about 200° C., preferably for convenience from about 0° C. to about 100° C. The time of mixing the various components is not critical; however, times of from about 5 minutes to about 2 hours are deemed to be most desirable. Rapid mixing of the catalyst components or poor agitation produces a catalyst which is relatively non-uniform with respect to particle size distribution amd produces polymers having an undesirably broad particle size distribution.

The magnesium compound, the optional aluminum compound, and the water, carbon dioxide or organic oxygen-containing compound may be mixed in any order of addition. A gelatinous precipitate forms when the oxygen-containing compound and magnesium compound are mixed and lumps will form if the reactants are mixed either with poor agitation, too rapidly or in too concentrated a mixture. These lumps result in a final catalyst which contains lumps which in turn produces a polymer under slurry polymerization conditions having an undesirably broad particle size distribution with a significant percentage of particles unable to pass through a 40 mesh screen. Addition of an aluminum compound results in a hydrocarbon solution of the magnesium compound and oxygen-containing compound mixture and eliminates these previously mentioned undesirable effects. It is preferable to add the oxygen-containing compound to a solution of the magnesium compound and the aluminum compound so as to obtain a desirably uniform polymer particle size distribution.

When the catalysts of this invention are used in solution polymerization conditions the above mentioned catalyst particle size distribution is not as important; however, if an aluminum compound is added as a solubilizing agent the catalyst preparation is simplified when using closed metal vessels for the catalyst preparation, such as would be used in the commercial production of polymers and copolymers of ethylene.

Suitable activating agents or catalysts with which the supported catalysts of the present invention can be reacted, contacted or employed in the polymerization of α-olefins include those aluminum, zinc or magnesium compounds represented by the formulas $AlR^3_{3-m}X_m$, $ZnR^3_2$, $ZnR^3X$, $MgR^3X$ or $MgR^3_2$ including mixtures thereof wherein each $R^3$ is independently a hydrocarbyl group as hereinbefore defined, X is a halogen, preferably chlorine or bromine, or a hydrocarbyloxy group as hereinbefore defined, m has a value of from zero to 2, preferably zero or 1 and most preferably zero.

Particularly suitable activating agents or cocatalysts include, for example, diethylaluminum chloride, diethylaluminum bromide, triethylaluminum, triisobutylaluminum, diethylaluminum ethoxide, dibutylmagnesium, mixtures thereof and the like.

The activators are employed in quantities such that the Al, Mg and/or Zn:Tm atomic ratio is from about 1:1 to about 5000:1, preferably from about 5:1 to about 1000:1 and most preferably from about 10:1 to about 400:1.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4methylpentene-1, hexene-1, octene-1, dodecene-1, octadecene-1, 1,7-octadiene and the like. It is understood that α-olefins may be copolymerized with other α-olefins and/or with small amounts i.e., up to about 25 weight percent based on the polymer of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40 weight percent of propylene, butene-1, hexene-1, octene-1, 4-methylpentene-1, 1,7-octadiene or similar α-olefin or α-diolefin based on total monomer.

α-olefins may be polymerized by employing mixtures of the herein described catalyst support with the herein described reducing cocatalysts. The polymerization can be conducted by either (1) reacting said support and said cocatalyst prior to addition to the polymerization reactor, (2) adding to the reactor a mixture of the two components or (3) adding the two components separately to the polymerization reactor or combinations thereof.

In the polymerization process employing the aforementioned catalysts, polymerization is effected by adding a catalytic amount of the above catalyst composition to a polymerization zone containing α-olefin monomer, or vice versa. The polymerization zone is maintained at temperatures in the range from about 0° to about 300° C., preferably from about 40° C. to about 90° C., for a residence time of about 30 minutes to several hours, preferably 1 hour to 4 hours. It is desirable to carry out the polymerization in the absence of moisture and oxygen and a catalytic amount of the catalytic reaction product is generally within the range from about 0.0001 to about 0.01 milligram-atoms transition metal per liter of diluent. It is understood, however, that the most advantageous catalyst concentration will depend upon polymerization conditions such as temperature, residence time, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that suitable inert diluents employed in the polymerization recipe are as defined as hereinbefore for use in preparation of the catalyst.

The polymerization pressures preferably employed are relatively low, i.e., from about 50 to about 500 psig. However, polymerization within the scope of the present invention can occur at pressures from atmospheric up to pressures determined by the capabilities of the polymerization equipment. During polymerization it is desirable to mix the polymerization recipe to obtain better temperature control and to maintain uniform polymerization mixtures throughout the polymerization zone.

In order to optimize catalyst yields in the polymerization of ethylene at solution polymerization conditions, it is preferred to maintain an ethylene concentration in the solvent in the range from about 0.1 to about 10 weight percent. To achieve this concentration when an excess of ethylene is fed into the system, a portion of the ethylene can be vented. Hydrogen is often employed in the practice of this invention to lower molecular weight of the resultant polymer. For the purpose of this invention, it is beneficial to employ hydrogen in concentrations ranging from about 0 to about 80 volume percent in the gas phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general methods described herein, the polymerization reactor can be operated liquid full or with a gas phase and either at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat or reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps and minimize contamination of the polymer with corrosive chloride residues. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values, $I_2$, were determined by ASTM D 1238, condition E. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, the catalyst components were blended while in a gloved box filled with nitrogen unless otherwise indicated. In the examples, the dibutylmagnesium was a commercial material obtained from the Lithium Corporation of America and the dihexylmagnesium was a commercial material obtained from the Ethyl Corporation. All ratios are molar ratios unless otherwise indicated.

EXAMPLE 1

(a) Catalyst Preparation

Seventy-five milliliters (1 mole) of n-propylalcohol dissolved in hexane (200 ml.) was slowly added to a stirred solution of 1053 ml. (0.5 mole) of 0.475 molar dibutylmagnesium in a heptane-cyclohexane mixture. Titanium tetrachloride (110 ml., 1 mole) was added dropwise to the resultant slurry with continuous stirring. After ½ hour the hydrocarbon insoluble products were allowed to settle and the supernatant solution was removed by decantation. The solids were reslurried with fresh hexane. The decantation was repeated four more times to remove hexane soluble reaction products.

The catalyst components were mixed to give an alcohol to magnesium molar ratio of 2:1 and a magnesium to titanium atomic ratio of 0.5:1. After the decantations, a hexane slurry of the solid catalyst was found by analysis to have a magnesium to titanium atomic ratio of 2.6:1 and a chloride to magnesium atomic ratio of 3.0:1.

(b) Polymerization of Ethylene

An aliquot of catalyst slurry, prepared in (a) above, containing 0.005 millimole of titanium was added to a 1.8 liter stirred stainless steel reactor containing 1.0 liter of dry oxygen free hexane, and 1.6 ml of 0.616 molar ATB (triisobutylaluminum) in hexane. The atomic ratio of Al:Ti was 200:1. The reactor nitrogen atmosphere was replaced with hydrogen by purging, the reactor contents were heated to 85° C., and the reactor pressure was adjusted to 60 psig (pounds per square inch gauge) with hydrogen. Ethylene was then added to maintain a reactor pressure of 170 psig. After two hours at 85° C., the reactor contents were filtered and the polyethylene dried in a vacuum overnight at about 60° C. to yield 288 g. polyethylene with a melt index of 0.47 and a bulk density of 19.3 pounds per cubic foot.

Catalyst efficiency was 1,200,000 grams polyethylene per gram titanium. Using the Cl, Mg, and Ti analysis of the catalyst slurry, the composition was calculated to be 2.6 $MgCl_2 \cdot TiCl_{2.6}(OnPr)_{1.4}$. This calculated composition then provides a calculated catalyst efficiency of 122,000 g. PE/g. catalyst. This demonstrates that the catalyst efficiency based on total solid catalyst is very high.

EXAMPLE 2

(a) Catalyst Preparation

ATB triisobutylaluminum, (0.616 molar, 203 ml., 0.13 mole), dihexylmagnesium (0.593 molar in hexane, 420 ml., 0.25 mole), hexane (900 ml.), and n-propylalcohol (76 ml.) were mixed to give a solution. To this solution was added dropwise a solution of 55 ml. (0.5 mole) titanium tetrachloride dissolved in 200 ml. of hexane. A uniform white solid formed and was decanted as in Example (1-a) to remove the hydrocarbon soluble products. The atomic ratio of magnesium to titanium in the catalyst preparation was 0.50 and after decanting was 3.6.

(b) Polymerization of Ethylene

The catalyst slurry from example (2-a) was used in the method described in example (1-b). Polyethylene (157 g.) having a melt index of 0.20 and a bulk density of 16.5 pounds per cubic foot was obtained. The catalyst efficiency was 656,000 grams of polyethylene per gram of titanium.

Analysis of the polyethylene powder obtained from (2-b) and (1-b) shows that the powder of (2-b) had 100% of its particles smaller than 400 microns while the powder from (1-b) had 31% of its particles larger than 400 microns. These large particles or "lumps" found in the polyethylene from the non-solubilized catalyst are undesirable in a continuous process production plant; therefore, it is preferred that the organomagnesium compound-alcohol reaction product be hydrocarbon soluble by mixing or complexing the organomagnesium compound with an aluminum, zinc or boron organometallic compound.

COMPARATIVE EXPERIMENT A (a) Catalyst Preparation

The procedure described in example 1 of British Pat. No. 1,275,641 (Solvay Et Cie) was repeated using magnesium ethoxide from the Alfa Division, Ventron Corporation.

(b) Polymerization of Ethylene

Triisobutylaluminum (4.0 millimoles, 6.5 ml. of 0.616 M in hexane) and an aliquot of catalyst containing 0.02 millimole of titanium were added to a stirred 1.8 liter reactor containing 1.0 liter of dry, oxygen-free hexane. The nitrogen atomsphere in the reactor was replaced with hydrogen, the reactor contents heated to 85° C., and the reactor pressure adjusted to 70 psig with hydrogen. Ethylene was then added to maintain a reactor pressure of 170 psig. After two hours the reactor contents were filtered and the polyethylene dried in a vacuum overnight at about 60° C. The polyethylene obtained weighed 157 grams, had a melt index of 0.85 and had a bulk density of 16.7 pounds per cubic foot. The catalyst efficiency was 164,000 grams of polyethylene per gram of titanium.

EXAMPLE 3

(a) Catalyst Preparation

A series of catalysts were prepared in which the Mg:Ti ratio of the components was varied. A solution of n-propylalcohol in 100 ml. hexane was slowly added to a hydrocarbon solution of dibutylmagnesium and triisobutylaluminum. After cooling to about 25° C., a 1.0 molar titanium tetrachloride solution in hexane was added dropwise. The resultant white slurry was stirred for one hour, the solids allowed to settle and the supernatent liquid removed by decantation. The solids were reslurried with fresh hexane and the decantation procedure repeated 5 additional times to remove most of the hexane soluble titanium species. Table I shows the exact quantities of the catalyst components.

TABLE I

| Catalyst No. | 0.583 M dibutyl-magnesium ml./mole | 0.616 M tri-isobutyl-aluminum ml./mole | n-propyl-alcohol, ml./mole | 1.0 M TiCl4 ml./mole | Mg:Ti in Catalyst Preparation | Cl:Mg in Catalyst Preparation |
|---|---|---|---|---|---|---|
| A | 214/0.125 | 102/0.0628 | 32.9/0.438 | 833/0.833 | 0.15:1 | 27:1 |
| B | 214/0.125 | 102/0.0628 | 32.9/0.438 | 500/0.5 | 0.25:1 | 16:1 |
| C | 214/0.125 | 102/0.0628 | 32.9/0.438 | 250/0.25 | 0.50:1 | 8:1 |
| D | 214/0.125 | 102/0.0628 | 32.9/0.438 | 125/0.125 | 1.00 | 4:1 |

(b) Polymerization of Ethylene

The polymerization procedure of Example (1-b) was repeated using 90 psig hydrogen instead of 60 psig and the catalyst and cocatalyst quantities and the polymerization results are shown in Table II.

TABLE II

| Catalyst No. | Catalyst, m moles Ti | Cocatalyst .616 M triisobutyl aluminum ml/mole | Al:Ti | Polyethylene g. | Catalyst Efficiency g PE/g Ti | Melt Index | Bulk Density lbs/ft³ |
|---|---|---|---|---|---|---|---|
| A | .0048 | 1.6/0.986 | 205:1 | 95 | 413,000 | 6.9 | 19.9 |
| B | .0063 | 2.0/1.23 | 195:1 | 250 | 828,000 | 8.4 | 20.3 |
| C | .0053 | 1.7/1.05 | 198:1 | 101 | 398,000 | 3.2 | 14.5 |

TABLE II-continued

| Catalyst No. | Catalyst, m moles Ti | Cocatalyst .616 M triisobutyl aluminum ml/mole | Al:Ti | Polyethylene g. | Catalyst Efficiency g PE/g Ti | Melt Index | Bulk Density lbs/ft³ |
|---|---|---|---|---|---|---|---|
| D | .0176 | 5.6/3.45 | 196:1 | 173 | 205,000 | 5.1 | 15.8 |

EXAMPLE 4

(a) Catalyst Preparation

A series of catalysts were prepared in which the amount of alcohol used in the catalyst preparation was varied. A solution of n-propylalcohol in 50 ml. hexane was slowly added to a hydrocarbon solution of dibutylmagnesium and triisobutylaluminum. After cooling to about 25° C., a 1.0 molar titanium tetrachloride solution in hexane was added dropwise. The resultant slurry was stirred for one hour, the solids allowed to settle and the supernatant liquid was removed by decantation. The solids were reslurried with fresh hexane and the decantation procedure was repeated 5 additional times to remove most of the hexane soluble titanium species. Table III shows the exact quantities of the catalyst components.

solids allowed to settle. The supernatant solution was removed by decantation, the solids were reslurried with fresh hexane and the decantation procedure was repeated five additional times. Analysis of the resultant hexane slurry gave an Mg:Ti ratio of 560:1.

(b) Polymerization of Ethylene

The polymerization procedure of Example (3b) was repeated using an aliquot of the catalyst from (a) above containing 0.09 millimoles of titanium and enough triisobutylaluminum to give an Al:Ti ratio of 200:1. After two hours, no polyethylene was obtained.

EXAMPLE 5

(a) Catalyst Preparation

A solution (444 pounds) of dibutylmagnesium in heptane containing 2.11% magnesium and 18.2% triiso-

TABLE III

| Catalyst No. | 0.583 M dibutyl-magnesium ml./mole | 0.616 M tri-isobutyl-aluminum ml./mole | n-propyl-alcohol, ml./mole | 1.0 M TiCl₄ ml./mole | Molar ratio of alcohol per alkyl group present in the alkyl magnesium and alkyl aluminum mixture | Color of solid precipitate After Addition of TiCl₄ |
|---|---|---|---|---|---|---|
| A | 107/0.06 | 50.8/0.03 | 13.2/0.18 | 250/0.25 | 0.86 | tan |
| B | 107/0.06 | 50.8/0.03 | 14.8/0.2 | 250/0.25 | 0.95 | tan |
| C¹ | 214/0.12 | 102/0.06 | 32.9/0.44 | 500/0.05 | 1.05 | white |
| D | 107/0.06 | 50.8/0.04 | 19.8/0.26 | 250/0.25 | 1.08 | white |
| E | 107/0.06 | 50.8/0.04 | 23.1/0.31 | 250/0.25 | 1.29 | white |
| F² | 211³/0.13 | 102/0.06 | 9.4/0.13 | 500/0.5 | 0.3 | brown |
| G | 214/0.12 | 102/0.06 | 37.8⁴/.50 | 500/.50 | 1.19 | white |

¹Same as Catalyst No. B of Example 3, alcohol diluted with 200 m. hexane.
²Comparative Experiment. The reaction product of the alcohol and organomagnesium compound-organoaluminum compound mixture substantially reduced TiCl₄ as evidenced by the brown color.
³The dibutylmagnesium was 0.593 M instead of 0.583 M.
⁴The n-propylalcohol contained 5000 parts per million of water by weight.

(b) Polymerization of Ethylene

The polymerization procedure of Example (3b) was repeated and the results listed in Table IV.

butylaluminum in hexane were mixed in stirred, jacketed 320 gallon reactor. Cooling was added to the vessel jacket and n-propylalcohol (97 pounds) was added at a rate such that the temperature of the reactor contents

TABLE IV

| Catalyst No. | Catalyst, m moles Ti | Cocatalyst 0.616 M triisobutyl aluminum ml./mole | Al:Ti | Polyethylene g. | Catalyst Efficiency g PE/g Ti | Melt Index | Bulk Density lbs/ft³ |
|---|---|---|---|---|---|---|---|
| A | .0054 | 1.7/1.05 | 194:1 | 94 | 363,000 | 2.1 | 16.9 |
| B | .0054 | 1.8/1.11 | 206:1 | 121 | 468,000 | 2.9 | 14.9 |
| C* | .0063 | 2.0/1.23 | 195:1 | 250 | 828,000 | 8.4 | 20.3 |
| D | .0049 | 1.6/0.99 | 202:1 | 197 | 839,000 | 2.5 | 15.4 |
| E | .0052 | 1.6/0.99 | 190:1 | 55 | 221,000 | 1.7 | 12.8 |
| F** | .0060 | 0.8/0.49 | 82:1 | 0 | 0 | — | — |
| F** | .050 | 8.1/4.99 | 100:1 | 45 | 18,000 | 0.3 | 8.3 |
| G | .0056 | 1.8/1.11 | 198:1 | 155 | 578,000 | 2.9 | 23.3 |

*same as catalyst No. B of Example 3.
**Comparative Experiment.

COMPARATIVE EXPERIMENT B

(a) Catalyst Preparation

A 1.0 molar TiCl₄ solution (110 ml.) was added dropwise at room temperature to a stirred slurry of 10.8 g. of finely powdered magnesium methoxide (obtained from Alfa Division of the Ventron Corporation) in 390 ml. hexane. The mixture was stirred for one hour and the did not rise above 30° C. The reactor contents were then maintained at 15° to 20° C. and a solution of 183 pounds titanium tetrachloride in 248 pounds of hexane was added at a rate of about 3 pounds per minute. The resultant white slurry was then transferred to a 900 gallon stirred reactor and diluted with 3,000 pounds of hexane. The resultant slurry was allowed to settle and the supernatant liquid removed by decantation. The solids were reslurried with fresh hexane and the decantation procedure repeated 5 more times. The resultant hexane slurry contained 8.2 millimoles of titanium per milliliter and the supernatant liquid, after all the solids had settled, contained less than 1 millimole of titanium per milliliter. The Mg:Ti ratio of the solid was 4:1.

(b) Polymerization of Ethylene

The catalyst prepared in Example (5a) was diluted to 0.15 millimolar in titanium. This diluted catalyst was then added at a rate of 1000 to 1600 pounds per hour to a two-thirds full, 20,000 gallon, jacketed reactor. Hydrogen was added to maintain 64% hydrogen by volume in the gas phase of the reactor. Simultaneously, 10,000 pounds of ethylene and 17,500 pounds of hexane per hour were added to the reactor while the reactor temperature and pressure were controlled at 85° C. and 170 psig respectively. The reactor contents were continuously removed, the polyethylene and hexane separated and the dried polyethylene collected. The polyethylene had a melt index of 8. The catalyst efficiency was about 600,000 pounds of polyethylene per pound of titanium.

EXAMPLE 6

(a) Catalyst Preparation

Catalysts were prepared in which the oxygen-containing organic compound was different than an alcohol. Thus, an oxygen-containing organic compound was mixed with 100 ml. of hexane and slowly added to a stirred solution of dibutylmagnesium in heptane. At about 25° C., a 1.0 molar solution of titanium tetrachloride in hexane was added dropwise. The resultant white or yellow slurry (indicating that it did not substantially reduce TiCl4) was stirred for one hour, the solids allowed to settle, and the supernatant liquid removed by decantation. The solids were reslurried with fresh hexane and the decantation procedure repeated 5 more times to remove most of the hexane soluble titanium species. Table V shows the exact quantities of the catalyst components.

cocatalyst quantities are shown in Table VI. The polymerization results are also listed in Table VI.

TABLE VI

| Catalyst No. | Catalyst, m moles Ti | Cocatalyst 0.616 M triisobutyl aluminum ml./mole | Al:Ti | Polyethylene g. | Catalyst Efficiency g PE/g Ti | Melt Index | Bulk Density lbs/ft³ |
|---|---|---|---|---|---|---|---|
| A | .035 | 5.7/3.51 | 100:1 | 225 | 134,000 | 1.9 | 20.7 |
| B | .025 | 4.1/2.53 | 100:1 | 14 | 12,000 | 0.2 | — |
| C | .040 | 6.5/4 | 100:1 | 106 | 55,000 | 1.0 | 17.5 |
| D | .070 | 11.4/7.02 | 100:1 | 22 | 7,000 | — | — |
| E | .024 | 3.9/2.4 | 100:1 | 83 | 72,000 | .06 | 17.7 |
| F | .017 | 5.7/3.51 | 206:1 | 108 | 133,000 | — | — |

COMPARATIVE EXPERIMENT C (a) Catalyst Preparation

Fifty milliliters (0.1 mole) of a 2.0 molar titanium tetrachloride solution in hexane was added dropwise to 42.2 ml. (0.02 mole) of a 0.593 M stirred solution of dibutylmagnesium in heptane at room temperature. The mixture was then stirred ½ hour, the solids allowed to settle, and the supernatant liquid removed by decantation. The solids were reslurried with fresh hexane and the decantation procedure repeated 5 more times to remove most of the hexane soluble titanium species. The Mg:Ti ratio was 0.25:1 in the catalyst preparation prior to decantation.

(b) Polymerization of Ethylene

The polymerization procedure of Example (4-b) was repeated using 2.2 ml. of 0.616 M triisobutylaluminum (1.36 millimoles aluminum) and an aliquot of the catalyst slurry prepared in (a) above containing 0.0068 millimoles of titanium. Thirty-eight grams of polyethylene was obtained having a bulk density of 11.6 pounds per cubic foot. The catalyst efficiency was only 117,000 grams of polyethylene per gram of titanium.

COMPARATIVE EXPERIMENT D (a) Catalyst Preparation

The catalyst preparation procedure of Comparative Experiment C was repeated except 18.2 ml. (0.011 mole) of 0.616 M triisobutylaluminum in hexane (11.2 millimoles aluminum) was added to the dibutylmagnesium solution before addition of the titanium tetrachloride. The Mg:Ti ratio of the catalyst preparation before decanting was 0.25:1.

(b) Polymerization of Ethylene

The polymerization procedure of Example 4 was repeated using 18.2 ml. of 0.616 M triisobutylaluminum (11.2 millimoles aluminum) and an aliquot of the catalyst slurry prepared in (a) above containing 0.056 milli-

TABLE V

| Catalyst No. | Oxygen-containing organic compound | oxygen-containing organic compound ml./mole | 0.593 M MgR₂, ml./mole | 2.0 M TiCl₄ ml./mole |
|---|---|---|---|---|
| A | Methyl Acetate | 7.9/100 | 84.3/0.05 | 200/0.4 |
| B | Acetic Anhydride | 7.4/100 | 84.3/0.05 | 200/0.4 |
| C | 2,2-Dimethoxypropane | 12.3/100 | 84.3/0.05 | 200/0.4 |
| D | Acetic Acid | 5.7/100 | 84.3/0.05 | 200/0.4 |
| E | Diethylcarbonate | 12.0/100 | 84.3/0.05 | 100/0.2 |
| F | Acetone | 12.9/175 | 84.3*/0.05 | 100/0.2 |

*40.6 ml. (0.03 mole) of a 0.616 M ATB solution in hexane was mixed with the MgR₂.

(b) Polymerization of Ethylene

The polymerization procedure of Example (1-b) was repeated using 50 psig hydrogen and the catalyst and moles of titanium. Polyethylene (114 grams) was obtained having a bulk density of 12.9 pounds per cubic foot. The catalyst efficiency was only 42,500 grams of polyethylene per gram of titanium.

COMPARATIVE EXPERIMENT E

(a) Catalyst Preparation

A n-propyl alcohol solution in hexane (18.8 ml., 0.25 mole, alcohol plus 100 ml. hexane) was added dropwise to 422 ml. (0.25 mole) of a stirred solution of 0.593 molar dibutylmagnesium in heptane. To the resultant slurry was added dropwise a solution of 110 ml. (1 mole) titanium tetrachloride and 100 ml. hexane. The resultant brown slurry was allowed to settle and the supernatant liquid was removed by decantation. The brown solids were reslurried with fresh hexane and the decantation procedure was repeated 5 more times to remove most of the hexane soluble titanium species. The brown color indicated that the dibutylmagnesium-n-propyl alcohol reaction product substantially reduced titanium.

(b) Polymerization of Ethylene

The polymerization procedure of Example (1-b) was repeated using 3.3 ml. of 0.616 M triisobutylaluminum (2.0 millimoles aluminum) and an aliquot of catalyst slurry prepared in (a) above containing 0.020 millimole of titanium. Polyethylene (252 grams) having a bulk density of 18.1 pounds per cubic foot and a melt index of 0.3 was obtained. The catalyst efficiency was 263,000 grams of polyethylene per gram of titanium.

EXAMPLE 7

(a) Catalyst Preparation

A solution of 37.6 ml. (0.5 mole) of n-propyl alcohol and 100 ml. hexane was added dropwise to a stirred solution of 532 ml. (0.25 mole) of 0.470 molar dibutylmagnesium in a heptane-cyclohexane mixture diluted with 200 ml. of hexane. To the resultant slurry at 40° C. was added dropwise a solution of 110 ml. (1 mole) titanium tetrachloride in 100 ml. hexane. The resultant white slurry was allowed to settle and the supernatant liquid was removed by decantation. The white solids were reslurried with fresh hexane and the decantation procedure was repeated 5 more times to remove most of the hexane soluble titanium species.

(b) Polymerization of Ethylene

The polymerization procedure of Example (1-b) was repeated using 0.80 ml. of 0.616 M triisobutylaluminum (0.49 millimole aluminum) and an aliquot of catalyst slurry prepared in (a) above containing 0.0050 millimoles of titanium. Polyethylene (325 grams) having a bulk density of 21.9 pounds per cubic foot and a melt index of 0.6 was obtained. The catalyst efficiency was 1,360,000 grams of polyethylene per gram of titanium.

COMPARATIVE EXPERIMENT F

(a) Catalyst Preparation

A solution was prepared by mixing 169 ml. (0.1 mole) of 0.593 molar dibutylmagnesium in heptane, 32.8 ml. (0.02 mole) of 0.616 M triisobutylaluminum in hexane, and 13.5 ml. (0.18 mole) n-propyl alcohol. After the alcohol had been slowly added, the solution was diluted to 250 ml. with hexane. A 100 ml. aliquot of this solution and 150 ml. hexane was continuously stirred at room temperature while 160 ml (0.16 mole) of 1.0 molar titanium tetrachloride in hexane was added dropwise. The resultant brown slurry was stirred for ½ hour, the brown solid was allowed to settle, and the supernatant liquid was removed by decantation. The brown solid was reslurried with fresh hexane and the decantation procedure was repeated 5 more times to remove most of the hexane soluble titanium species. The brown color indicated that the alcohol reaction product with the dibutyl magnesium and ATB substantially reduced the TiCl₄.

(b) Polymerization of Ethylene

The polymerization procedure of Example (6-b) was repeated using 2.3 ml. of 0.616 M triisobutylaluminum in hexane (1.42 m moles aluminum) and an aliquot of the catalyst slurry prepared in (a) above containing 0.0072 millimoles of titanium. Polyethylene (88 grams) was obtained. The catalyst efficiency was 255,000 grams of polyethylene per gram of titanium.

EXAMPLE 8

(a) Catalysts Preparation

A solution (16.0 pounds) of 8.92% dibutylmagnesium in heptane was mixed with 6.7 pounds of 18% triisobutylaluminum using a jacketed stainless steel vessel having a mechanical stirrer. The temperature of this solution was maintained at about 25° C. while 1,381 ml. of n-propyl alcohol was slowly added. A 2.0 molar solution (15.12 pounds) of titanium tetrachloride in hexane was then added in about 20 minutes. The white solids were allowed to settle and a portion of the supernatant liquid was removed by decantation. The solids were reslurried with fresh hexane and the decantation procedure was repeated 10 more times to remove most of the hexane soluble titanium species. The resultant slurry was diluted with hexane to give a slurry which was 0.30 millimolar in titanium.

(b) Copolymerization of Ethylene and Butene-1

Ethylene and butene-1 were continuously copolymerized in a 150 gallon stirred, jacketed reactor at 85° C. by adding 300 pounds per hour hexane, 50 pounds per hour of ethylene, and enough butene-1 to give the desired polymer density. Hydrogen was added to the partially liquid full reactor to maintain about 53% by volume in the gas phase of the reactor. The reactor pressure was maintained at about 170 psig by the rate at which the catalyst slurry prepared in (a) above was added. A dilute solution of triisobutylaluminum in hexane was continuously added to the reactor along with the catalyst at a rate so as to maintain an Al:Ti ratio of about 100:1 in the reactor. The polymer slurry was continuously removed from the reactor and the polymer separated from the hexane. The dried polymer powder had a melt index of 6.7, a bulk density of 25 pounds per cubic foot, and a density of 0.957 using method ASTM D1505-63T. The catalyst efficienty was 588,000 pounds of polymer per pound of titanium.

EXAMPLE 9

(a) Catalyst Preparation

Hexane (200 ml.), 167 ml. of 0.750 M dibutylmagnesium (125 millimoles) in heptane, and 57.9 ml. of 1.08 M diethylzinc in hexane were mixed in a stirred flask. To the resultant solution was added dropwise a solution of 28.2 ml. of n-propyl alcohol (375 millimoles) in 200 ml. hexane. The slurry got hot and some hexane was lost by evaporation. Hexane was added to give a total volume of about 700 ml. Titanium tetrachloride (27.5 ml., 250 millimoles) mixed with hexane (100 ml.) was

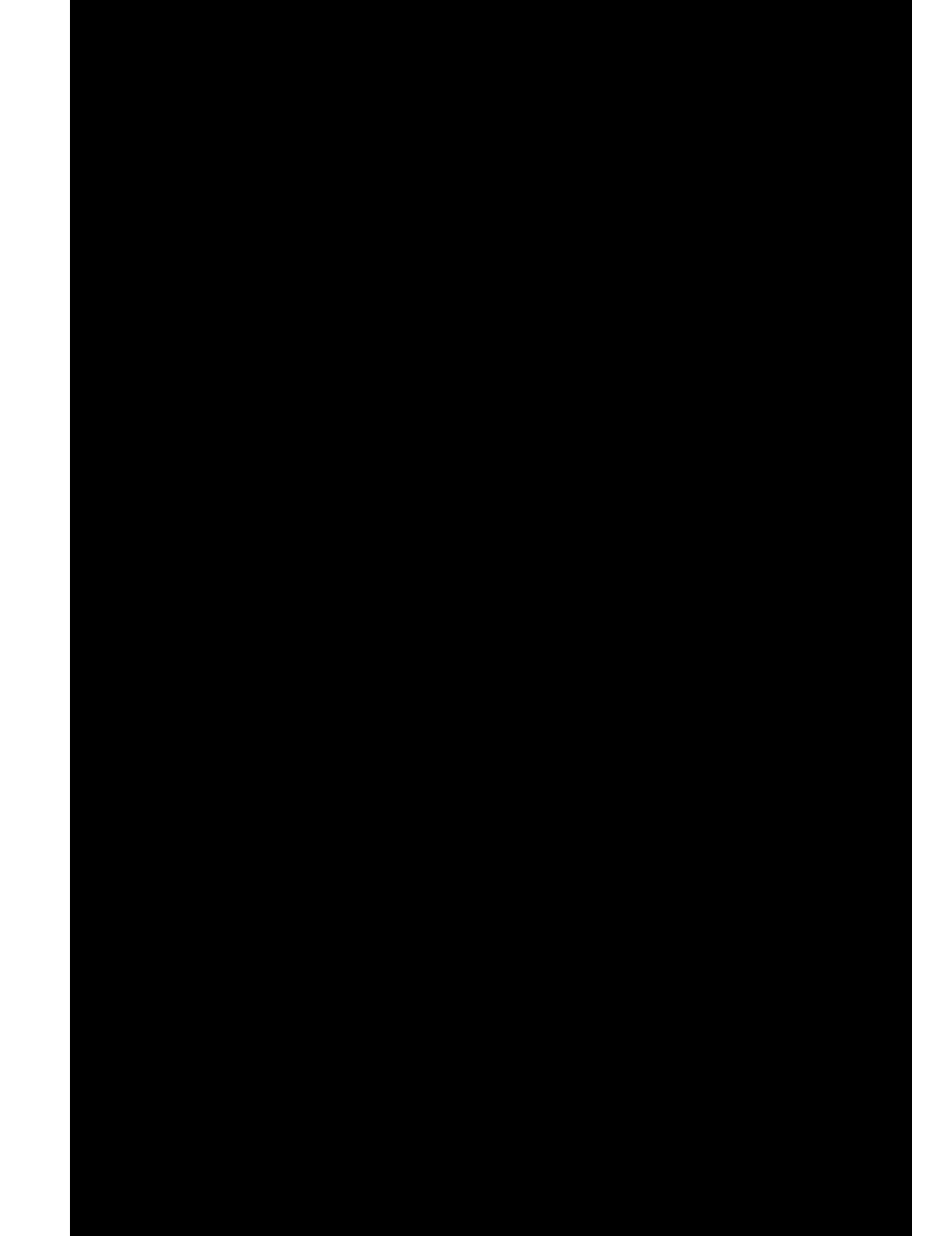

the Al:Tm atomic ratio is from about 5:1 to about 1000:1.

13. The solid catalyst of claim 12 wherein each $R^3$ is an aliphatic hydrocarbon and the Al:Tm atomic ratio is from about 10:1 to about 400:1.

14. The solid catalyst of claim 13 wherein said activating agent is triisobutyl aluminum.

15. A process for preparing a hydrocarbon insoluble solid catalyst which process comprises:
   (A) reacting in the presence of an inert diluent
      (1) the reaction product of
         (a) a magnesium component or mixture of such components represented by the formula $MgR_2 \cdot xMeR'_{x'}$ wherein each R is independently a hydrocarbyl group having from 1 to about 20 carbon atoms, each R' is independently a hydrocarbyl or a hydrocarbyloxy group having from 1 to about 20 carbon atoms, Me is aluminum, zinc or boron, x has a value of from zero to about 10, and x' has a value equal to the valence of Me; with
         (b) a sufficient amount of at least one of water, carbon dioxide or an organic, oxygen-containing compound, free of halogen and nitrogen atoms so as to to react with the hydrocarbyl groups present in component (1-a); to produce a product which will not substantially reduce $TiCl_4$ at a temperature of about 25° C.; with
      (2) a halide-containing, transition metal compound or mixture of such compounds represented by the formula $TmY_nX_{z-n}$ wherein Tm is a metal selected from groups IV-B, V-B and VI-B of the Periodic Table of Elements, Y is oxygen or OR", each X is a halogen, each R" is independently a hydrocarbyl group having from 1 to about 20 carbon atoms, z has a value equal to the valence of said transition metal, n has a value of from zero to 6 with the value of z-n being from at least 1 up to a value equal to the valence of the transition metal; said halide-containing transition metal compound being present in a quantity so as to convert substantially all of the substituent groups attached to a magnesium atom in the solid reaction product (1) to a halide group;
   (B) recovering the resultant hydrocarbon insoluble reaction product therefrom; and
   (C) reacting said hydrocarbon insoluble reaction product in a hydrocarbon diluent with an activating agent represented by the formulas $AlR^3{}_{3-m}X_m$, $ZnR^3X$, $ZnR^3{}_2$, $MgR^3X$ or $MgR^3{}_2$ including mixtures thereof wherein each $R^3$ is independently a hydrocarbyl group having from 1 to about 20 carbon atoms, X is a halogen or a hydrocarbyloxy group having from 1 to about 20 carton atoms, m has a value from zero to 2; and wherein the Al, Zn and/or Mg:Tm atomic ratio is from about 1:1 to about 5000:1.

16. The process of claim 15 wherein in component (1-a) each R and R' group is independently an aliphatic hydrocarbyl group having from 1 to about 10 carbon atoms; Me is aluminum; said inert diluent is a hydrocarbon or mixture of hydrocarbons having from about 4 to about 10 carbon atoms; n has a value of zero to 1 and the activating agent is a compound represented by the formula $AlX_mR^3{}_{3-m}$ wherein each $R^3$ is a hydrocarbyl group having from 1 to about 10 carbon atoms and the Al:Tm atomic ratio is from about 5:1 to about 1000:1.

17. The process of claim 16 wherein the value of x and each R and R' are such that the magnesium compound is soluble in said diluent, m has a value of zero to 1, each X is a chlorine; n has a value of zero, and the atomic ratio of Al:Tm is from about 10:1 to about 400:1 and Tm is titanium.

18. The process of claim 17 wherein the value of x and each R and R' are such that the solid reaction product (1) is soluble in said inert diluent.

19. The process of claims 15, 16, 17 or 18 wherein component (1-b) is water, carbon dioxide or an organic, oxygen-containing compound selected from acetals, ketals, orthoesters, carboxylic acid anhydrides, carbonates, glycols and mixtures thereof.

20. The process of claims 15, 16, 17 or 18 wherein the organic, oxygen-containing compound is selected from, alcohols, epoxides, aldehydes, ketones, carboxylic acids, esters of carboxylic acids and mixtures thereof and wherein said alcohols, aldehydes and ketones can be either anhydrous or contain up to about 50% water by weight.

21. The process of claim 20 wherein the organic, oxygen-containing compound is an alcohol or mixture of alcohols having from 1 to about 20 carbon atoms and which is anhydrous or contains up to about 1 percent water by weight.

22. The process of claim 21 wherein said alcohol is methyl alcohol, ethyl alcohol, n-propyl alcohol, isopropyl alcohol, n-butyl alcohol, sec-butyl alcohol, tert-butyl alcohol, phenol, 2,6 diisopropylphenol and mixtures thereof.

23. The process of claims 15, 16, 17 or 18 wherein step (C) is conducted by (a) mixing a hydrocarbon stream containing the reaction product recovered in step (B) with a hydrocarbon stream containing said activating agent or (b) feeding said streams separately into a reactor for polymerizing α-olefins and containing at least one polymerizable α-olefin or mixtures thereof with another polymerizable monomer under polymerization conditions wherein said reaction between the solid product recovered in step (B) and said activating agent occurs.

24. The process of claim 19 wherein step (C) is conducted by (a) mixing a hydrocarbon stream containing the reaction product recovered in step (B) with a hydrocarbon stream containing said activating agent or (b) feeding said streams separately into a reactor for polymerizing α-olefins and containing at least one α-olefin or mixtures thereof with another polymerizable monomer under polymerization conditions wherein said reaction between the solid product recovered in step (B) and said activating agent occurs.

25. The process of claim 20 wherein step (C) is conducted by (a) mixing a hydrocarbon stream containing the reaction product recovered in step (B) with a hydrocarbon stream containing said activating agent or (b) feeding said streams separately into a reactor for polymerizing α-olefins and containing an α-olefin or mixtures thereof with another polymerizable monomer under polymerization conditions wherein said reaction between the solid product recovered in step (B) and said activating agent occurs.

26. The process of claim 21 wherein step (C) is conducted by (a) mixing a hydrocarbon stream containing the reaction product recovered in step (B) with a hydrocarbon stream containing said activating agent or (b) feeding said streams separately into a reactor for polymerizing α-olefins and containing an α-olefin or mixtures thereof with another polymerizable monomer under polymerization conditions wherein said reaction between the solid product recovered in step (B) and said activating agent occurs.

27. The process of claim 23 wherein step (C) is conducted by (a) mixing a hydrocarbon stream containing the reaction product recovered in step (B) with a hydrocarbon stream containing said activating agent or (b) feeding said streams separately into a reactor for polymerizing α-olefins and containing an α-olefin or mixtures thereof with another polymerizable monomer under polymerization conditions wherein said reaction between the solid product recovered in step (B) and said activating agent occurs.

28. In a catalyst comprising a transition metal supported by a magnesium halide prepared from a halogen-free organomagnesium precursor compound and a transition metal halide; the improvement wherein the transition metal halide compound is contacted with an organomagnesium precursor compound which is the reaction product of a dihydrocarbyl magnesium compound and at least one of water, carbon dioxide or an organic, oxygen-containing compound free of halogen and nitrogen atoms under conditions which will not substantially reduce $TiCl_4$ at a temperature of 25° C.

29. The catalyst of claim 28 wherein the dihydrocarbyl magnesium compound is represented by the formula $MgR_2 \cdot xMeR'_{x'}$ wherein each R is independently a hydrocarbyl group having from 1 to about 20 carbon atoms, each R' is independently a hydrocarbyl or a hydrocarbyloxy group having from 1 to about 20 carbon atoms, Me is aluminum, zinc or boron, x has a value from zero to about 10 and x' has a value equal to the valence of Me.

30. The catalyst of claim 29 wherein each R and R' are alkyl groups having from 1 to about 10 carbon atoms, Me is aluminum, x has a value such that the organomagnesium precursor compound is hydrocarbon soluble and the transition metal is titanium.

* * * * *

UNITED STATES PATENT AND TRADEMARK OFFICE
CERTIFICATE OF CORRECTION

PATENT NO. : 4,244,838

DATED : January 13, 1981

INVENTOR(S) : Donald E. Gessell

It is certified that error appears in the above-identified patent and that said Letters Patent are hereby corrected as shown below:

Column 2, line 29; change "partically" to --practically--.

Column 3, line 31; change "aout" to --about--.

Column 3, line 45; change "born" to --boron--.

Column 4, line 35; change "$R'$" to --$R''$--.

Column 4, line 52, change "pentaerty" to --pentaery--.

Column 5, line 33; change "20" to --10--.

Column 6, line 10; change "0" to --10--.

Column 7, line 27; change "-50°0" to-- -50°--

Column 8, line 30; change "4 methylpentene-1", to --4-methylpentene-1,--.

Column 9, line 20; change "i.e.," to --e.g.--.

Column 9, line 59; change "or" to --of--.

Column 12, line 16; change "atomsphere" to --atmosphere--.

Column 16, In Table VI, under heading "Melt Index" fifth line; change ".06" to --0.6--.

UNITED STATES PATENT AND TRADEMARK OFFICE
CERTIFICATE OF CORRECTION

PATENT NO. : 4,244,838

DATED : January 13, 1981

INVENTOR(S) : Donald E. Gessell

It is certified that error appears in the above-identified patent and that said Letters Patent are hereby corrected as shown below:

Column 19, line 29; delete "," after "decantation".

Column 20, line 34; insert --,-- after "acetals".

Signed and Sealed this

Ninth Day of June 1981

[SEAL]

Attest:

RENE D. TEGTMEYER

*Attesting Officer*     *Acting Commissioner of Patents and Trademarks*